(12) United States Patent
Glanzer et al.

(10) Patent No.: US 12,234,613 B2
(45) Date of Patent: *Feb. 25, 2025

(54) PLATE COMPACTOR

(71) Applicant: MILWAUKEE ELECTRIC TOOL CORPORATION, Brookfield, WI (US)

(72) Inventors: Evan M. Glanzer, Milwaukee, WI (US); John E. Koller, Waukesha, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/365,333

(22) Filed: Aug. 4, 2023

(65) Prior Publication Data

US 2023/0374741 A1    Nov. 23, 2023

Related U.S. Application Data

(63) Continuation of application No. 17/369,489, filed on Jul. 7, 2021.
(Continued)

(51) Int. Cl.
*E01C 19/28* (2006.01)
*E01C 19/38* (2006.01)
(Continued)

(52) U.S. Cl.
CPC ............ *E01C 19/38* (2013.01); *E01C 19/285* (2013.01); *E02D 3/074* (2013.01); *H02K 7/061* (2013.01)

(58) Field of Classification Search
CPC ....... E01C 19/285; E01C 19/38; E02D 3/074; H02K 7/061
(Continued)

(56) References Cited

U.S. PATENT DOCUMENTS 3,306,174 A   2/1967  Wardell
3,530,577 A   9/1970  Franklin et al.
(Continued)

FOREIGN PATENT DOCUMENTS

CN   2267271 Y   11/1997
CN   2837369 Y   11/2006
(Continued)

OTHER PUBLICATIONS

International Search Report and Written Opinion for Application No. PCT/US2021/040669 dated Oct. 7, 2021 (11 pages).
(Continued)

*Primary Examiner* — Raymond W Addie
(74) *Attorney, Agent, or Firm* — Michael Best & Friedrich LLP

(57) ABSTRACT

A compactor including a plate, an electric motor coupled to the plate and including a motor shaft configured to rotate about a rotational axis, and an exciter coupled to the plate and configured to vibrate the plate in response to receiving torque from the electric motor. The exciter includes an exciter shaft and an eccentric mass attached thereto. The compactor additionally includes a battery configured to provide power to the electric motor, and a gear train to transfer torque from the motor shaft to the exciter shaft. The gear train permits the exciter to be driven at a rotational speed that is faster or slower than a rotational speed of the electric motor.

16 Claims, 3 Drawing Sheets

Related U.S. Application Data

(60) Provisional application No. 63/059,250, filed on Jul. 31, 2020, provisional application No. 63/048,722, filed on Jul. 7, 2020.

(51) Int. Cl.
    *E02D 3/074*     (2006.01)
    *H02K 7/06*     (2006.01)

(58) Field of Classification Search
    USPC .................................. 404/113, 133.05, 133.1
    See application file for complete search history.

(56) References Cited

U.S. PATENT DOCUMENTS

| | | |
|---|---|---|
| 3,543,655 A | 12/1970 | Uebel |
| 3,759,624 A | 9/1973 | Hundey et al. |
| 3,802,791 A | 4/1974 | Uebel et al. |
| 3,832,080 A | 8/1974 | Stoecker |
| 3,883,260 A | 5/1975 | Heckner |
| 3,917,426 A | 11/1975 | Wohlwend et al. |
| 3,972,637 A | 8/1976 | Sutherland |
| 4,113,403 A | 9/1978 | Tertinek et al. |
| 4,145,156 A | 3/1979 | Grane |
| 4,199,271 A | 4/1980 | Riedl |
| 4,356,736 A | 11/1982 | Riedl |
| 4,775,263 A | 10/1988 | Persson |
| 4,838,730 A | 6/1989 | Owens |
| 5,632,569 A | 5/1997 | Szmansky |
| 5,672,027 A | 9/1997 | Wadensten |
| 5,890,834 A | 4/1999 | Waldenberger |
| 5,957,622 A | 9/1999 | Vera-Montiel |
| 6,179,520 B1 * | 1/2001 | Cochran ................ E02D 3/074 404/114 |
| 6,213,673 B1 | 4/2001 | Jungwirth et al. |
| 6,213,681 B1 | 4/2001 | Sick et al. |
| 6,374,569 B1 | 4/2002 | Suckow |
| 6,379,082 B1 | 4/2002 | Takemoto |
| 6,394,697 B1 | 5/2002 | De Boer |
| 6,435,767 B1 | 8/2002 | Steffen |
| 6,558,073 B1 | 5/2003 | Wrazidlo |
| 6,582,155 B1 | 6/2003 | Bromberger et al. |
| 6,659,685 B1 | 12/2003 | Persson |
| 6,717,379 B1 | 4/2004 | Andersson |
| 6,722,815 B2 | 4/2004 | Fervers |
| 6,794,632 B1 | 9/2004 | Steffen |
| 6,808,336 B2 | 10/2004 | Fervers et al. |
| 6,846,128 B2 | 1/2005 | Sick |
| 6,923,595 B1 | 8/2005 | Chek |
| 6,953,304 B2 | 10/2005 | Quenzi et al. |
| 7,052,204 B2 | 5/2006 | Lutz |
| 7,097,384 B2 | 8/2006 | Lindley |
| 7,175,365 B1 | 2/2007 | Breeding |
| 7,303,356 B2 | 12/2007 | Schennach et al. |
| 7,427,176 B2 | 9/2008 | Persson et al. |
| 7,465,121 B1 | 12/2008 | Hendricks et al. |
| 7,491,014 B2 | 2/2009 | Sick |
| 7,686,538 B2 | 3/2010 | Lutz et al. |
| 7,753,621 B2 | 7/2010 | Steffen |
| 7,988,383 B2 | 8/2011 | Hickmann |
| 8,047,742 B2 | 11/2011 | Sick et al. |
| 8,123,432 B1 | 2/2012 | Steffen |
| 8,182,173 B2 | 5/2012 | Lickel |
| 8,439,600 B2 | 5/2013 | Brening |
| 8,602,680 B2 | 12/2013 | Fischer et al. |
| 8,608,402 B2 | 12/2013 | Argento et al. |
| 8,721,218 B2 | 5/2014 | Stenzel |
| 9,010,452 B2 | 4/2015 | Williamson et al. |
| 9,139,966 B1 | 9/2015 | Mikowychok |
| 9,175,447 B2 | 11/2015 | Steffen |
| 9,284,697 B2 | 3/2016 | Steffen |
| 9,334,613 B2 | 5/2016 | Erdmann et al. |
| 9,695,605 B2 | 7/2017 | Jin |
| 9,879,389 B1 | 1/2018 | Lura |
| 9,925,563 B2 | 3/2018 | Bartl et al. |
| 10,184,217 B2 | 1/2019 | Mikowychok |
| 10,265,730 B2 | 4/2019 | Johnsson et al. |
| 10,344,439 B2 * | 7/2019 | Steffen ................ E01C 19/38 |
| 2006/0067796 A1 | 3/2006 | Riedl |
| 2006/0127190 A1 | 6/2006 | Kremer |
| 2006/0193693 A1 | 8/2006 | Congdon |
| 2006/0272130 A1 | 12/2006 | Togami et al. |
| 2008/0298893 A1 | 12/2008 | Stenzel et al. |
| 2010/0139424 A1 | 6/2010 | Wagner |
| 2010/0166499 A1 | 7/2010 | Stenzel et al. |
| 2010/0199774 A1* | 8/2010 | Stenzel ................ E01C 19/38 73/672 |
| 2010/0278590 A1 | 11/2010 | Stenzel |
| 2012/0251241 A1 | 10/2012 | Sperfslage |
| 2013/0243526 A1* | 9/2013 | Williamson ........ A47L 11/4097 405/271 |
| 2014/0262400 A1 | 9/2014 | Berger |
| 2015/0159384 A1 | 6/2015 | Wetherell |
| 2015/0376845 A1 | 12/2015 | Bartl |
| 2017/0022673 A1 | 1/2017 | Mckee |
| 2017/0275831 A1 | 9/2017 | Sorg et al. |
| 2019/0234028 A1 | 8/2019 | Laugwitz et al. |
| 2020/0076337 A1 | 3/2020 | Abbott et al. |

FOREIGN PATENT DOCUMENTS

| | | |
|---|---|---|
| CN | 201092652 Y | 7/2008 |
| CN | 100430554 C | 11/2008 |
| CN | 101671993 A | 3/2010 |
| CN | 101671996 A | 3/2010 |
| CN | 202164588 U | 3/2012 |
| CN | 202247634 U | 5/2012 |
| CN | 202500128 U | 10/2012 |
| CN | 202519568 U | 11/2012 |
| CN | 202519569 U | 11/2012 |
| CN | 203603137 U | 5/2014 |
| CN | 203834321 U | 9/2014 |
| CN | 203834322 U | 9/2014 |
| CN | 203834323 U | 9/2014 |
| CN | 104674635 A | 6/2015 |
| CN | 204626211 U | 9/2015 |
| CN | 204703042 U | 10/2015 |
| CN | 204728309 U | 10/2015 |
| CN | 204898642 U | 12/2015 |
| CN | 205636716 U | 10/2016 |
| CN | 106192977 A | 12/2016 |
| CN | 205839549 U | 12/2016 |
| CN | 106868990 A | 6/2017 |
| CN | 206298804 U | 7/2017 |
| CN | 206428562 U | 8/2017 |
| CN | 206428563 U | 8/2017 |
| CN | 107165030 A | 9/2017 |
| CN | 206570656 U | 10/2017 |
| CN | 107354933 A | 11/2017 |
| CN | 206843911 U | 1/2018 |
| CN | 207073052 U | 3/2018 |
| CN | 207244834 U | 4/2018 |
| CN | 207392011 U | 5/2018 |
| CN | 207392183 U | 5/2018 |
| CN | 207469046 U | 6/2018 |
| CN | 207484244 U | 6/2018 |
| CN | 207512557 U | 6/2018 |
| CN | 207608902 U | 7/2018 |
| DE | 1911878 A1 | 12/1970 |
| DE | 1634679 B1 | 1/1971 |
| DE | 1964318 A1 | 7/1971 |
| DE | 2155687 A1 | 5/1973 |
| DE | 2319947 A1 | 10/1974 |
| DE | 2336631 A1 | 2/1975 |
| DE | 7316290 U | 7/1976 |
| DE | 3230747 A1 | 2/1984 |
| DE | 8223313 U1 | 3/1984 |
| DE | 3040123 C2 | 4/1984 |
| DE | 3240626 C2 | 1/1985 |
| DE | 8513149 U1 | 1/1988 |
| DE | 9013243 U1 | 2/1991 |
| DE | 4016822 A1 | 11/1991 |
| DE | 9213315 U1 | 12/1992 |
| DE | 9418184 U1 | 1/1995 |

(56) References Cited

FOREIGN PATENT DOCUMENTS

| | | |
|---|---|---|
| DE | 29605664 U1 | 7/1996 |
| DE | 29804047 U1 | 6/1998 |
| DE | 29920177 U1 | 1/2000 |
| DE | 19840453 C2 | 9/2000 |
| DE | 19912813 C1 | 12/2000 |
| DE | 202004015141 U1 | 12/2004 |
| DE | 102007006209 A1 | 11/2007 |
| DE | 202009000264 U1 | 3/2009 |
| DE | 202009004301 U1 | 11/2009 |
| DE | 202009004302 U1 | 11/2009 |
| DE | 102010019053 A1 | 11/2011 |
| DE | 202007019293 U1 | 11/2011 |
| DE | 202010017338 U8 | 1/2013 |
| DE | 102007003927 B4 | 12/2013 |
| DE | 102008017058 B4 | 3/2017 |
| DE | 102016009029 A1 | 2/2018 |
| EP | 0200949 A2 | 11/1986 |
| EP | 0464939 A1 | 1/1992 |
| EP | 1267001 B1 | 9/2009 |
| EP | 2458089 A2 | 5/2012 |
| EP | 2357283 B1 | 6/2013 |
| EP | 1980671 B1 | 11/2015 |
| EP | 2940213 A1 | 11/2015 |
| EP | 2947205 A1 | 11/2015 |
| EP | 3069798 A1 | 9/2016 |
| EP | 3085832 A1 | 10/2016 |
| EP | 2957486 B1 | 1/2018 |
| GB | 2455627 A | 6/2009 |
| JP | 2006009458 A | 1/2006 |
| JP | 2013181324 A | 9/2013 |
| WO | WO1985002220 A1 | 5/1985 |
| WO | WO1999041461 A1 | 8/1999 |
| WO | WO2002070824 A1 | 9/2002 |
| WO | WO2008049542 A1 | 5/2008 |
| WO | WO2009121606 A1 | 10/2009 |
| WO | WO2010086669 A1 | 8/2010 |
| WO | WO2011157344 A1 | 12/2011 |
| WO | WO2012062384 A2 | 5/2012 |
| WO | WO2013137015 A1 | 9/2013 |
| WO | WO2018019408 A1 | 2/2018 |
| WO | WO2018068091 A1 | 4/2018 |
| WO | WO-2020077829 A1 * | 4/2020 ............ E02D 3/074 |

OTHER PUBLICATIONS

Partial Supplementary European Search Report for Application No. 21837737.2 dated May 17, 2024 (14 pages).

* cited by examiner

PLATE COMPACTOR

CROSS-REFERENCE TO RELATED APPLICATIONS

This application is a continuation of U.S. patent application Ser. No. 17/369,489, filed on Jul. 7, 2021, now U.S. Pat. No. 12,065,790, which claims priority to U.S. Provisional Patent Application No. 63/059,250 filed on Jul. 31, 2020 and U.S. Provisional Patent Application No. 63/048,722 filed on Jul. 7, 2020, the entire contents of all of which are incorporated herein by reference.

FIELD OF THE INVENTION

The present invention relates to plate compactors.

BACKGROUND OF THE INVENTION

Plate compactors include a plate that is caused to vibrate in order to compact soil or other loose material.

SUMMARY OF THE INVENTION

The present invention provides, in one aspect, a compactor including a plate, an electric motor coupled to the plate and including a motor shaft configured to rotate about a rotational axis, an exciter coupled to the plate and configured to vibrate the plate in response to receiving torque from the electric motor, wherein the exciter includes an exciter shaft and an eccentric mass attached thereto, a battery configured to provide power to the electric motor, and a gear train to transfer torque from the motor shaft to the exciter shaft, wherein the gear train permits the exciter to be driven at a rotational speed that is faster or slower than a rotational speed of the electric motor.

The present invention provides, in another aspect, a compactor including a plate, an electric motor coupled to the plate and including a motor shaft configured to rotate about a rotational axis, an exciter coupled to the plate and configured to vibrate the plate in response to receiving torque from the electric motor, wherein the exciter includes an exciter shaft parallel with the rotational axis and an eccentric mass attached thereto, a battery configured to provide power to the electric motor, and a gear train rotationally coupling the motor shaft and the exciter shaft, wherein the gear train transfers torque from the electric motor to the exciter, causing the eccentric mass to rotate.

The present invention provides, in yet another aspect, a compactor including a plate, an electric motor coupled to the plate and including a motor shaft configured to rotate about a rotational axis, an exciter coupled to the plate and configured to vibrate the plate in response to receiving torque from the electric motor, wherein the exciter includes an exciter shaft coaxial with the rotational axis and an eccentric mass attached thereto, and a gear train positioned on the rotational axis and rotationally coupling the electric motor and the exciter, wherein the gear train and the exciter are located on one side of the electric motor, and wherein the gear train is configured to transfer torque from the electric motor to the exciter, causing the eccentric mass to rotate.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
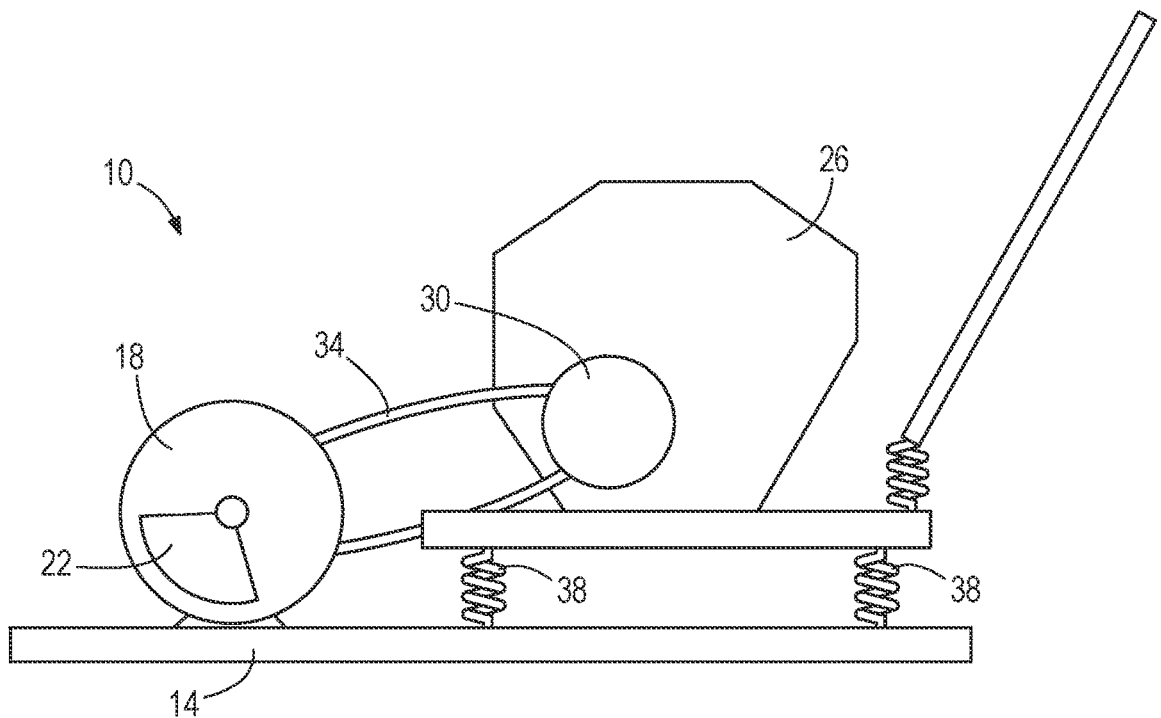
FIG. 1 is a schematic plan side view of a plate compactor.

As shown in FIG. 1, a typical gas-powered plate compactor 10 includes a plate 14, an exciter 18 with an eccentric mass 22 to vibrate the plate 14, and a gas engine 26 to drive the exciter 18 via an output pulley 30 and a belt 34. The gas engine 26 is vibrationally isolated from the exciter 18, via vibration isolators 38 or dampers, to protect the gas engine 26 from excessive vibration. While minimizing vibration is good, this arrangement is not efficient. To maximize runtime in battery powered systems, efficiency is critical because battery energy density is currently significantly lower than gasoline.

Figure 2:
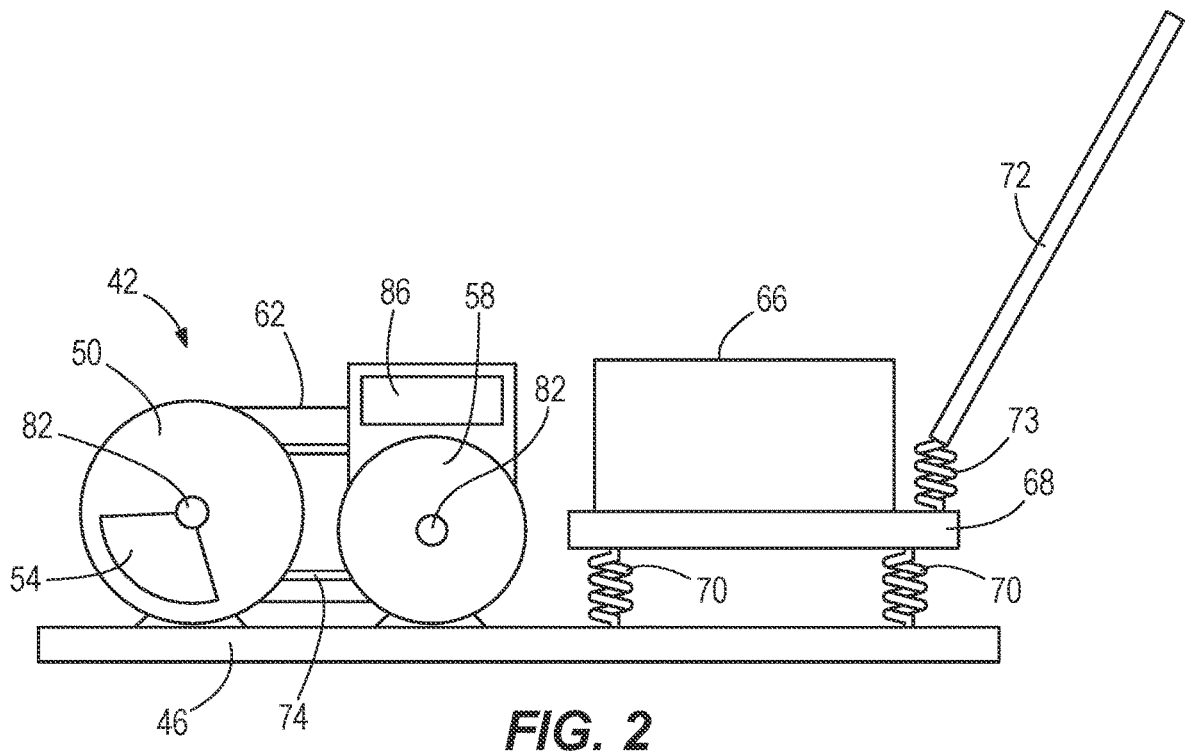
FIG. 2 is a schematic plan side view of a plate compactor according to an embodiment of the invention.
Figure 3:
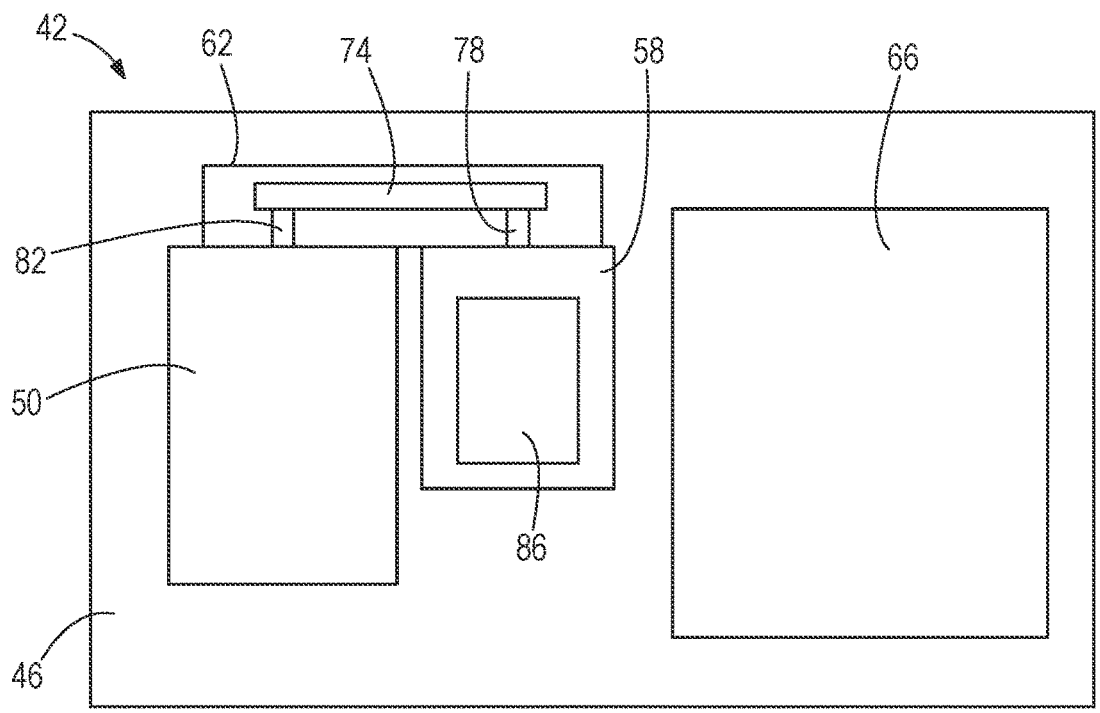
FIG. 3 is a schematic top plan view of the plate compactor of FIG. 2.

FIGS. 2 and 3 illustrate an embodiment of a plate compactor 42 including a plate 46, an exciter 50 with an eccentric mass 54 to vibrate the plate 46, and an electric motor 58 to drive the exciter 50 via a torque transfer device 62 (e.g., a transmission, an endless drive member such as a roller chain or a belt, and/or a gear train). Although the plate 46 is schematically illustrated as a single body, the plate 46 may comprise a combination of rigidly connected components that facilitate sliding the compactor 42 across a work surface to be compacted. A battery 66 (e.g., a battery pack) powers the electric motor 58. The battery 66 is mounted on a platform 68 that is vibrationally isolated from the electric motor 58 by vibration isolators 70 or dampers between the platform 68 and the plate 46. Thus, the battery 66 is vibrationally isolated from the electric motor 58. Likewise, a handle 72 is coupled to and vibrationally isolated from the platform 68 via another vibration isolator 73. Alternatively, the handle 72 may instead be coupled to the plate 46.

Figure 2A:
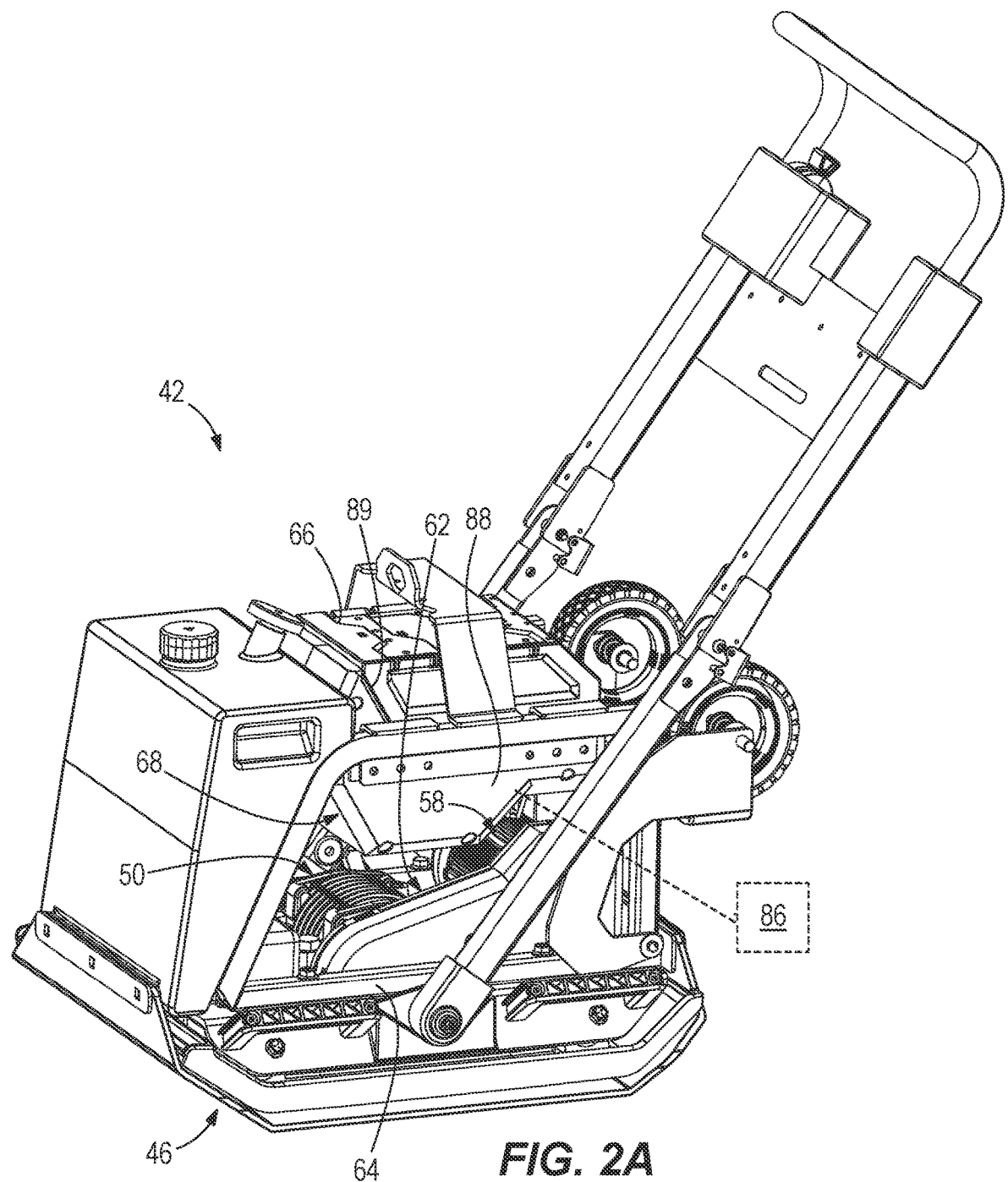
FIG. 2A is a perspective view of a plate compactor according to another embodiment of the invention.

The electric motor 58 and the exciter 50 are directly coupled to the plate 46 so that there is no relative motion (i.e., axial displacement) between them. The torque transfer device 62 includes a gear train 74, for example, that transfers torque from a motor shaft 78 to an exciter shaft 82. Thus, the gear train 74 permits the exciter 50 to be driven faster or slower than the electric motor 58. In the embodiment of FIGS. 2 and 3, control electronics 86 for controlling operation of the electric motor 58 are coupled to the electric motor 58 for cooling purposes, but in other embodiments, the control electronics 86 can be mounted on a portion of the plate compactor 42 that is vibrationally isolated from the exciter 50, such as the platform 68 along with the battery 66. In an embodiment of the compactor 26 in which the platform 68 is configured as a housing 88 defining thereon a battery receptacle 89 to which the battery 66 is connectable (FIG. 2A), the control electronics 86 may be located within the housing 88. In some embodiments, the compactor 26 may include an intermediate frame 64 interconnecting the housing 88 and the plate 46 (e.g., via additional vibrational isolators 73). In operation of the plate compactor 42, the control electronics 86 control operation of the electric motor 58, which drives the exciter 50 via the gear train 74, thus rotating the eccentric mass 54 about the exciter shaft 82, imparting vibration to the plate 46.

Figure 4:
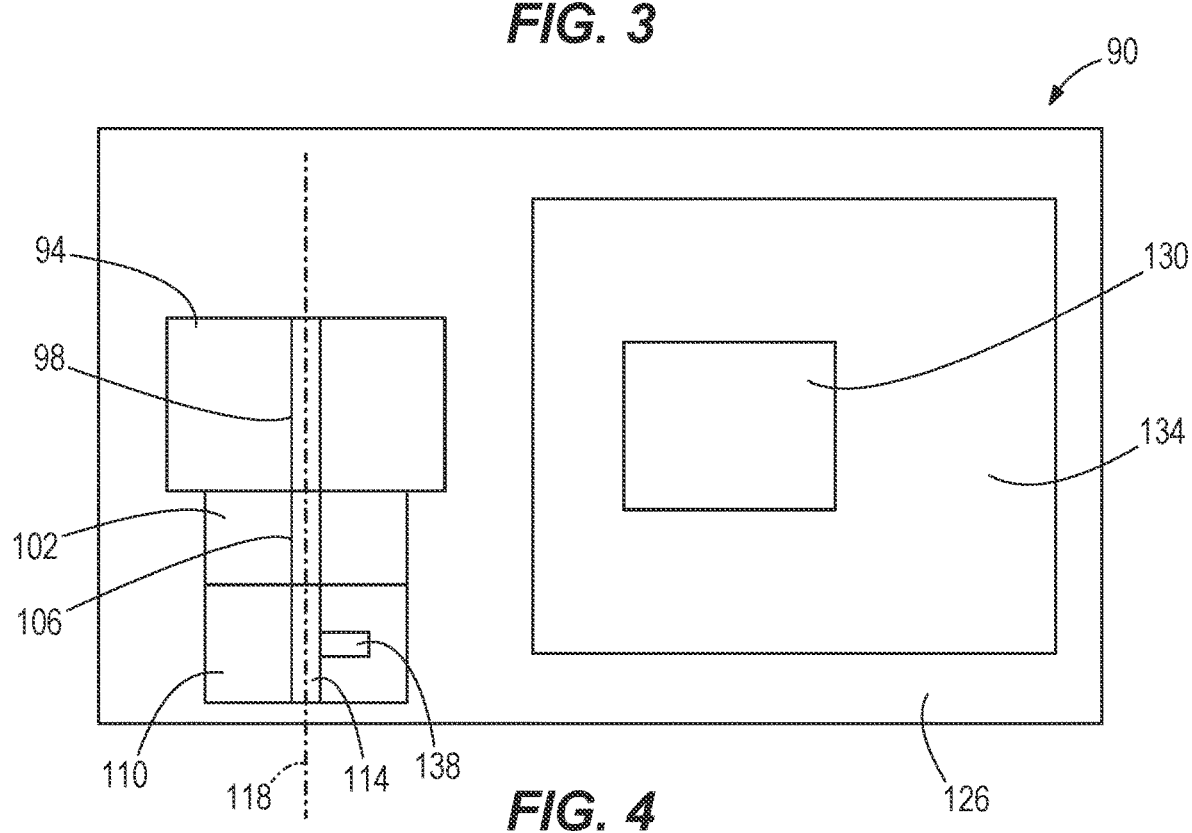
FIG. 4 is a schematic top plan view of a plate compactor according to another embodiment of the invention.

FIG. 4 illustrates another embodiment of a plate compactor 90 that is similar to the embodiment of FIGS. 2 and 3, except that an electric motor 94, motor shaft 98, gearbox 102, exciter 110, and exciter shaft 114 are arranged on a rotational axis 118. The gearbox 102, gear train 106, exciter 110, exciter shaft 114, and an eccentric mass 138 are all on one side of the electric motor 94. As in the embodiment of FIGS. 2 and 3, the electric motor 94 and the exciter 110 are directly coupled to a plate 126 so that there is no relative motion (i.e., axial displacement) between them. In the embodiment of FIG. 4, control electronics 130 could be mounted with the electric motor 94 or could be mounted with a battery 134, as shown in FIG. 4. In operation of the plate compactor 90, the control electronics 130 control operation of the electric motor 94, which drives the exciter 110 via the gear train 106, thus rotating the eccentric mass 138 about the exciter shaft 114, imparting vibration of the plate 126.

By utilizing a gear train 74, 106 to transfer torque from the electric motor 58, 94 to the exciter 50, 110, the plate compactors 42, 90 of FIGS. 2-4 achieve a longer runtime than an embodiment in which the electric motor is isolated from the exciter and provides torque to the exciter via a belt.

Although the invention has been described in detail with reference to certain preferred embodiments, variations and modifications exist within the scope and spirit of one or more independent aspects of the invention as described.

Various features of the invention are set forth in the following claims.

What is claimed is:

1. A compactor comprising:
a plate;
an electric motor coupled to the plate and including a motor shaft configured to rotate about a rotational axis;
an exciter coupled to the plate and configured to vibrate the plate in response to receiving torque from the electric motor, wherein the exciter includes an exciter shaft and an eccentric mass attached thereto, wherein the exciter shaft is configured to receive torque from the motor shaft to rotate the eccentric mass to impart vibration to the plate, and wherein the exciter shaft is parallel with the rotational axis;
a battery configured to provide power to the electric motor; and
a gear train to transfer torque from the motor shaft to the exciter shaft, wherein the gear train permits the exciter to be driven at a rotational speed that is faster than, slower than, or a same speed as a rotational speed of the electric motor.

2. The compactor of claim 1, further comprising:
control electronics configured to control operation of the electric motor; and
a vibration isolator coupling the battery and the control electronics to the plate.

3. The compactor of claim 2, further comprising a platform upon which the battery is supported, wherein the platform is coupled to the plate via the vibration isolator.

4. The compactor of claim 3, wherein the platform is configured as a housing, and wherein the control electronics are located within the housing.

5. A compactor comprising:
a plate;
an electric motor coupled to the plate and including a motor shaft configured to rotate about a rotational axis;
an exciter coupled to the plate and configured to vibrate the plate in response to receiving torque from the electric motor, wherein the exciter includes an exciter shaft parallel with the rotational axis and an eccentric mass attached thereto;
a battery configured to provide power to the electric motor; and
a gear train rotationally coupling the motor shaft and the exciter shaft, wherein the gear train transfers torque from the electric motor to the exciter, causing the eccentric mass to rotate.

6. The compactor of claim 5, further comprising control electronics coupled to the electric motor and configured to control operation of the electric motor.

7. The compactor of claim 6, wherein the battery is supported on a platform upon which the battery is supported, and wherein the compactor further comprises a vibration isolator coupling the platform to the plate.

8. The compactor of claim 7, wherein the platform is configured as a housing, and wherein the control electronics are located within the housing.

9. The compactor of claim 8, further comprising a frame configured to couple the housing and the plate.

10. A compactor comprising:
a plate;
an electric motor coupled to the plate and including a motor shaft configured to rotate about a rotational axis;
an exciter coupled to the plate and configured to vibrate the plate in response to receiving torque from the electric motor, wherein the exciter includes an exciter shaft coaxial with the rotational axis and an eccentric mass attached thereto; and
a gear train positioned on the rotational axis and rotationally coupling the electric motor and the exciter, wherein the gear train and the exciter are located on one side of the electric motor, and wherein the gear train is configured to transfer torque from the electric motor to the exciter, causing the eccentric mass to rotate.

11. The compactor of claim 10, wherein the gear train permits the exciter to be driven at a rotational speed that is faster or slower than a rotational speed of the electric motor.

12. The compactor of claim 10, wherein the electric motor and the exciter are directly coupled to the plate.

13. The compactor of claim 10, further comprising control electronics configured to control operation of the electric motor.

14. The compactor of claim 13, further comprising a platform configured as a housing in which the control electronics are located, wherein the platform is coupled to the plate via a vibration isolator.

15. The compactor of claim 14, further comprising a battery configured to provide power to the electric motor, wherein the battery is supported upon the platform.

16. The compactor of claim 15, wherein the control electronics are coupled to one of the electric motor and the battery.

* * * * *